(12) United States Patent
Beekhuis (10) Patent No.: US 7,962,247 B2
(45) Date of Patent: Jun. 14, 2011

(54) COMPUTER IMPLEMENTED SYSTEMS AND METHODS FOR START-UP, CALIBRATION AND TROUBLESHOOTING OF AN INSTALLED RENEWABLE ENERGY SYSTEM

(75) Inventor: Christiaan Willem Beekhuis, San Jose, CA (US)

(73) Assignee: Power-One Renewable Energy Solutions, LLC, Camarillo, CA (US)

( * ) Notice: Subject to any disclaimer, the term of this patent is extended or adjusted under 35 U.S.C. 154(b) by 886 days.

(21) Appl. No.: 11/919,042

(22) PCT Filed: Apr. 28, 2006

(86) PCT No.: PCT/US2006/016449
§ 371 (c)(1),
(2), (4) Date: Oct. 22, 2007

(87) PCT Pub. No.: WO2006/119111
PCT Pub. Date: Nov. 9, 2006

(65) Prior Publication Data
US 2009/0313081 A1    Dec. 17, 2009

Related U.S. Application Data

(60) Provisional application No. 60/676,390, filed on Apr. 29, 2005.

(51) Int. Cl.
*G06F 19/00*      (2006.01)
(52) U.S. Cl. ............................................ 700/291; 714/2
(58) Field of Classification Search .................. 700/286, 700/291, 295; 707/104.1, 999; 713/2; 705/10
See application file for complete search history.

(56) References Cited

U.S. PATENT DOCUMENTS

| | | | |
|---|---|---|---|
| 5,566,084 A | 10/1996 | Cmar | |
| 5,930,773 A | 7/1999 | Crooks et al. | |
| 6,169,979 B1 | 1/2001 | Johnson | |
| 6,519,730 B1 | 2/2003 | Ando et al. | |
| 6,978,931 B2 | 12/2005 | Brobeck | |
| 7,107,495 B2* | 9/2006 | Kitamorn et al. | 714/43 |
| 7,177,859 B2* | 2/2007 | Pather et al. | 1/1 |
| 2002/0019802 A1 | 2/2002 | Malme et al. | |
| 2002/0087234 A1 | 7/2002 | Lof et al. | |
| 2003/0115251 A1 | 6/2003 | Fredrickson et al. | |
| 2003/0126060 A1 | 7/2003 | Lof et al. | 705/36 |
| 2004/0002972 A1* | 1/2004 | Pather et al. | 707/6 |
| 2004/0002988 A1* | 1/2004 | Seshadri et al. | 707/102 |
| 2004/0143428 A1 | 7/2004 | Rappaport et al. | |
| 2004/0163011 A1 | 8/2004 | Shaw | |
| 2004/0205403 A1 | 10/2004 | Markow et al. | |
| 2004/0260981 A1 | 12/2004 | Kitamorn et al. | |
| 2005/0229039 A1 | 10/2005 | Anderson et al. | |

OTHER PUBLICATIONS

Fatspniel p. A-D; image retreved on www.archive.org / "waybackmachine" www.fatspaniel.com.*

* cited by examiner

*Primary Examiner* — Kidest Bahta
(74) *Attorney, Agent, or Firm* — Waddey & Patterson; Mark J. Patterson; Gary L. Montle (57) ABSTRACT

Systems and methods are provided for collecting, aggregating, and analyzing data associated with the installation and deployment of systems. Energy systems, (500) specifically renewable energy generation systems, are used as examples. The aggregated data serve as the basis for a variety of services that improve the system performance, improve the installation, lower the cost, and provide monitoring and service to maintain optimum performance. Finally, services are provided that improve the start-up, calibration, and configuration of systems.

18 Claims, 6 Drawing Sheets

COMPUTER IMPLEMENTED SYSTEMS AND METHODS FOR START-UP, CALIBRATION AND TROUBLESHOOTING OF AN INSTALLED RENEWABLE ENERGY SYSTEM

FIELD OF THE INVENTION

In general, the present invention relates to computer implemented systems and methods for providing services to a network of customers, more specifically to services enabled by methods comprising the collection, aggregation, and analysis of data in a central database from a plurality of systems that are not otherwise associated with one another to provide performance metrics and most particularly to the establishment and improvement of various performance metrics related to the execution of customer activities and the initiation of specific actions related to performance in comparison with such metrics. More specifically, the present invention relates to computer implemented services enabled by systems and methods comprising the collection, aggregation, and analysis of data related to the installation and operation of renewable energy systems comprising solar energy, wind turbine energy, tidal energy, geothermal energy, and the like, or to distributed energy generation systems comprising waste-to-energy generation systems, fuel cells, microturbines, diesel generators, and the like.

BACKGROUND OF THE INVENTION

There is increased interest in the development and deployment of renewable energy systems comprising solar energy, wind turbine energy, tidal energy, geothermal energy, and the like, or to distributed energy generation systems comprising waste-to-energy generation systems, fuel cells, microturbines, diesel generators, and the like. This interest is being driven by a number of factors including a limited supply of fossil fuels, global warming considerations, increased pollution from the acquisition and use of fossil fuels, rising costs of fossil fuels, the loss of natural lands due to the construction of fossil fuel power plants, continued utility grid degradation and blackouts, unpredictable energy prices, the need for local power generation in disaster recovery situations, the need to move away from centralized power plants to distributed energy systems for homeland security, and the like. Advancements in the development of renewable energy and distributed energy generation technologies have overcome earlier impediments such as poor efficiency, installation difficulty, high cost, high maintenance, and the like and are presently offering increasingly attractive alternatives to fossil fuel power systems in the generation and delivery of electric power.

One of the issues faced by the renewable energy and distributed energy generation industries is that the adoption and deployment of such systems is often sporadic and not well coordinated. The decision to invest in and install a renewable energy or distributed energy generation system is typically made at the individual entity level rather than as a planned activity for an entire community. For economy of language, in this context, an "entity" may comprise an individual, a company, an office building, a shopping mall, a shopping center, a sports complex, or other such organization, business, or group investing collectively in a source of energy. Consequently, the renewable energy and distributed energy generation industries often lack the coordinated, integrated infrastructure that is typically common in other industries. The lack of infrastructure inhibits the adoption and installation of new renewable energy and distributed energy generation systems and does not allow these industries to gain advantages due to cooperation or economies of scale to lower costs, increase acceptance and deployment, and attract additional investment capital.

Accordingly, there is a need for further developments in methods and systems to facilitate the connection and cooperation of the wide variety of entities and individual implementations of renewable energy or distributed energy generation systems to improve efficiencies, lower costs, facilitate new services, facilitate management and improvement of the energy production and distribution system as a whole, facilitate and improve training and education, facilitate energy commerce, and the like. In particular, there is a need for improved systems and methods to establish Best Known Method (BKM) configuration data for systems and communicating this data to the system or to the Installation technician for efficient calibration, testing, and start-up of the system. Additionally, there is a need for systems and methods that improve the service response to systems whose System Performance metrics do not meet the expected values.

BRIEF SUMMARY OF THE INVENTION

Advancements in the development of renewable energy and distributed energy generation systems have overcome, to a large extent, earlier impediments such as poor efficiency, installation difficulty, high cost, high maintenance, and the like. Specifically, advancements in the technology associated with the capture and conversion of solar energy into useable electricity has led to an increased adoption and deployment rate of solar energy generation systems. However, the infrastructure associated with collecting and analyzing data associated with the distribution infrastructure, system performance, system response, system efficiency, costs, savings associated with the system, and the like has not grown at the same pace as the implementation of solar energy generation systems. Systems and methods for the collection, aggregation, and analyzing of this data and providing services based on the results of the analysis have been developed as part of some embodiments of the present invention.

In some embodiments of the present invention, the data collection systems and methods cited above may use a local communications device installed at the site of the renewable energy generation or distributed energy generation system to collect data on the system comprising system ID, location, performance, calibration, ambient conditions, efficiency, temperature, wind speed, wind direction, solar irradiance, energy generation, device status flags, and the like. Typical data collection systems comprise embedded sensors, external sensors, embedded computers, and the like. Typical local communications devices comprise modems, routers, switches, embedded computers, wireless transmitters, and the like. The data may be transmitted via a wireless or hard-wired network or other communication means to a secure, central database where the data is aggregated with data from other systems and analyzed to provide value added services to the members of the renewable energy or distributed energy generation supply chain. Examples of suitable networks comprise the Internet, a Local Area Network (LAN), a Wide Area Network (WAN), a wireless network, cellular networks (e.g., GSM, GPRS, etc.), combinations thereof, and the like. Various embodiments of the present invention include security features such that proprietary or business-sensitive data is not accessible among different business entities, thereby providing all entities access to aggregated information while compromising the security of none.

Various embodiments of the present invention relate generally to systems and methods that utilize the secure, centrally collected, aggregated, and analyzed data to provide a number of beneficial services. The services may be desirable and useful to many "Supply Chain Entities" within the renewable energy or distributed energy generation system supply chain. For economy of language, we use the term, Supply Chain Entity or Entities to refer to one or more of the "Installation Technician", the "Value Added Reseller (VAR)", the "System Integrator", the "Original Equipment Manufacturer (OEM)" component supplier, the "local energy utility", various local government agencies, the Project Financier or Investor, the Distributed Utility provider, among others. These labels have been used for convenience in the context of the present teaching. It will be clear to those skilled in the art that those entities or parties that provide similar functions and services within the supply chain may use a wide variety of names and labels. These labels do not limit the scope of the present invention in any way.

In some embodiments of the present invention, the aggregated data may be used to offer services to the System Integrators, VARs, and OEMs that improve the response to conditions of poor system performance. Data across the network may be used to establish benchmark metrics for system performance. Individual system performance metrics are compared to the benchmark metrics and the services may highlight systems that are deserving of additional attention and scrutiny because their performance metrics exceed the benchmark metrics. The services may also highlight systems that would benefit from service calls or troubleshooting activities because their performance metrics fall below the benchmark metrics. The services may perform troubleshooting and corrective action routines on those systems whose performance metrics do not meet the benchmark metrics. The services may notify the System Integrators, VARs, and OEMs with the results of the troubleshooting and corrective action routines as well as recommended action. The services may determine if the system might be covered by a warranty or a service contract. The services may also determine if the system might be configured with current upgrades or might represent an upgrade sales opportunity. The System Integrators, VARs, and OEMs may enjoy the benefits of improved system performance, improved system efficiency, shorter reaction/service time, lower costs, increased efficiency in the use and deployment of resources, increased End User satisfaction, increased reliability, and the like.

In some embodiments of the present invention, the aggregated data may be used to offer services to the VARs that improve the use and performance of the various Installation Technicians in their employment. Data across the network may be used to establish benchmark metrics for Best Known Method (BKM) software and firmware settings and system parameters for enhanced system performance. After completing the initial hardware installation, the Installation Technician may connect and activate the local communications device and generate a request for system set-up, calibration, configuration, start-up, and testing. The services may aggregate data from a plurality of installed systems in the same region with similar OEM components as well as other system attributes and establish the BKM software and firmware settings and system parameters. These BKM values may be automatically downloaded directly into the local system control devices or communicated to the Installation Technician for manual programming and system start-up may begin. The system performance metrics may be compared to the benchmark metrics. These services may be particularly advantageous since many of the system parameters may be dependent upon factors such as time of year, installation region, system orientation, system tilt angle, system tracking features, system tracking capabilities and the like. These services relieve the Installation Technician from the responsibility of installing the BKM system parameters and ensure improved system installation and testing.

The methods of some embodiments of the present invention may be implemented on a plurality of systems. The systems may comprise one or more energy systems, sensors contained within the energy systems to monitor various settings and performance attributes of the energy systems, sensors associated with the energy systems to measure various environmental conditions, a communications device for managing two-way communications between the sensors, the energy systems, and a network, a network for transmitting the data to a centralized database, a centralized database for receiving and storing data from a plurality of systems, user interfaces for interacting with the centralized database, procedures for acting upon the data, and a plurality of output means for displaying the results of the procedure treatments.

BRIEF DESCRIPTION OF THE DRAWINGS

Other aspects, embodiments and advantages of the invention may become apparent upon reading of the detailed description of the invention and the appended claims provided below, and upon reference to the drawings in which:

DETAILED DESCRIPTION OF THE INVENTION

In general, various embodiments of the present invention relate to systems and methods that utilize secure, centrally collected, aggregated, and analyzed data to provide a number of beneficial services. The services may be desirable and useful to many Supply Chain Entities within the renewable energy or distributed energy generation system supply chain.

Figure 1:
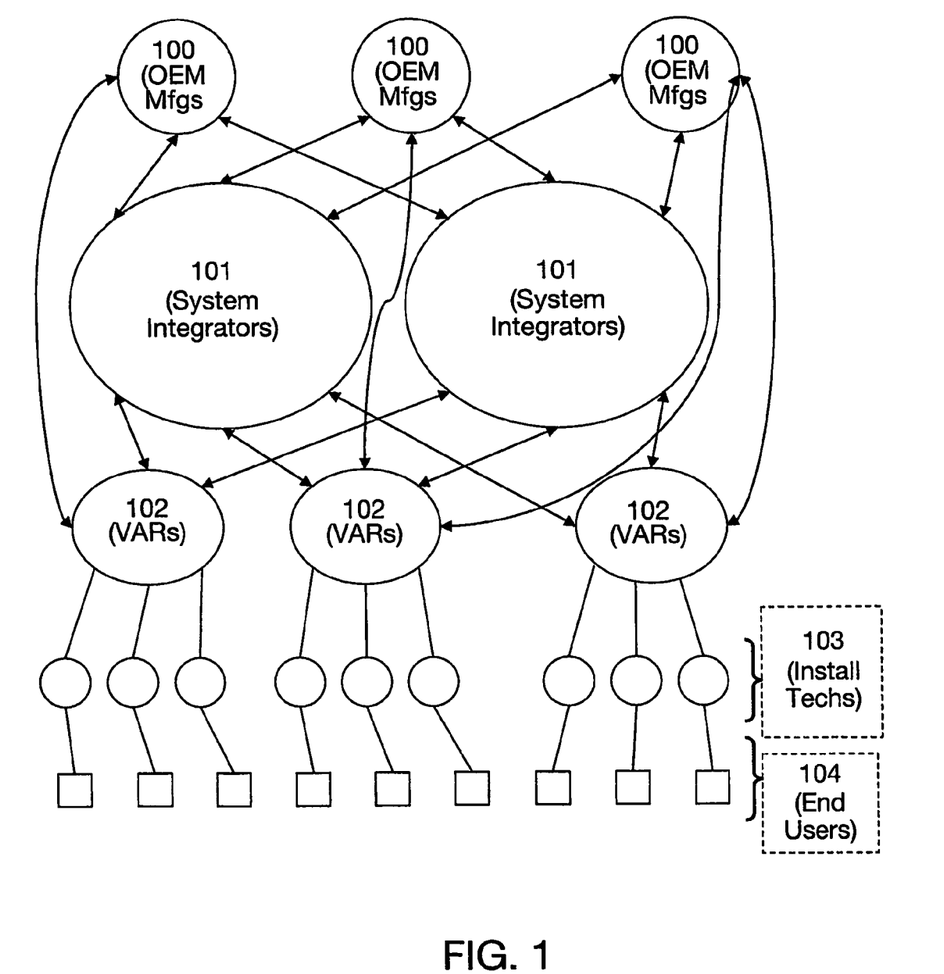
FIG. 1 is a schematic representation of a portion of a typical renewable energy or distributed generation system supply chain.

In some embodiments of the present invention, the systems and methods provide services to the various Supply Chain Entities in the renewable energy or distributed energy generation system supply chain. As an illustration, consider the supply chain structure illustrated in FIG. 1 wherein, large national Systems Integrators, 101, market and sell the renewable energy or distributed energy generation systems to End Users, 104. Typically, the System Integrators may design and oversee the installation and commissioning of the renewable energy or distributed energy generation systems. The System Integrators may contract with VARs, 102, who are local to the End Users and who may perform services comprising installation, service, upgrades, retrofits, and the like on behalf of the System Integrators. Furthermore, the VARs may employ a plurality of Installation Technicians, 103, who may perform services comprising installation, service, upgrades, retrofits, and the like on behalf of the VARs. OEM component suppliers, 100, may supply components to the System Integrators, 101, or the VARs, 102. These labels have been used for convenience in the context of the present teaching. It will be clear to those skilled in the art that those entities or parties that provide similar functions and services within the supply chain may use a wide variety of names and labels. These labels do not limit the scope of the present invention in any way.

In an exemplary embodiment of the present invention, the systems and methods may be applied to a solar energy generation system. However, the solar energy example does not limit the scope of the present invention in any way. The systems and methods described herein may be applied to any general system. Specifically, the systems and methods described herein may be applied to any general energy system such as an energy consumption system, an energy generation system, an energy storage system, combinations thereof, and the like. More specifically, the systems and methods described herein may be applied to any renewable energy generation comprising solar energy, wind turbine energy, tidal energy, geothermal energy, and the like, or distributed energy generation technology comprising waste-to-energy generation technologies, fuel cells, microturbines, diesel generators, and the like or any combination thereof. In the context of the present teaching, a system comprising more than one type of system as listed above will be designated a "hybrid" system.

Typically, the solar energy system may be installed by an Installation Technician following an established installation checklist. This is illustrated by timeframe, 200, in FIG. 2 and is typically about 5 days. The system may be connected to a central database via a network. Examples of suitable networks comprise the Internet, a Local Area Network (LAN), a Wide Area Network (WAN), a wireless network, cellular networks (e.g., GSM, GPRS, etc.), combinations thereof, and the like. In this exemplary embodiment, System Identification Data are collected at the point of sale by the System Integrator or the VAR, said System Identification Data comprising, End User identification, system warranty information, system performance guarantee commitment information, expected system power output, and the like. The System Identification Data are static in time meaning that they may not generally change once established. The System Identification Data may be entered into the central database and serve as a unique identifier for the system. System Configuration Data are collected during the manufacture and testing of the system, said System Configuration Data comprising, system configuration with OEM component identification, system wiring details, system tracking features, system tracking capabilities and the like. The System Configuration Data are generally static in time meaning that they may not generally change once established. However, the System Configuration Data may change during periods of service, upgrades, or enhancements to the system. The System Configuration Data may be entered into the central database and associated with the unique System Identification Data previously entered. System Installation Data are collected at the time of installation, said System Installation Data comprising, VAR identity, Installation Technician identity, installation region, system orientation, system tilt angle, expected shading, time to complete the system installation, number of errors during the system installation, an End User satisfaction index (EUSI), firmware revision, system parameter settings, and the like. In the context of the present teaching, "expected shading" may be associated with the area and time that the system is covered by shadows due to neighboring trees, building, structures, etc. It may be expressed in units of % coverage per hour for each time period of interest comprising months, seasons, years, billing periods, and the like. This quantity may be useful in estimating the performance of the system. The System Installation Data are static in time meaning that they may not generally change once established. The System Installation Data may be entered into the central database and associated with the unique System Identification Data previously entered. System Performance Data and ambient condition data are collected continuously at a predefined interval after start-up of the system, said System Performance Data comprising, system response, system performance, ambient temperature, solar irradiance, conversion efficiency, current tilt angle, system energy output, current firmware revision, current system parameter settings, device fault and error codes, power, voltage, cumulative energy generated, and the like. The System Performance Data change with time and are entered into the central database as a time series with associated date and time stamps. The temporal System Performance Data are associated with the unique System Identification Data previously entered. The data correlated to the installation region may be aggregated to several levels of granularity, said levels comprising country, time zone, state or province, county, postal code, Global Positioning System (GPS) coordinates, and the like. Additionally, System History Data may be associated with each unique System Identification Data record. The System History Data captures changes in the System Configuration Data over time. Examples of System History Data comprise time-to-first-service-call, details of the service calls, steps taken to resolve the issues in the service calls, upgrades to the system configuration, new firmware revisions, new parameter settings, and the like. Entries in the System History Data typically contain date and time stamps so that changes may be tracked over the life of the system.

Through the services provided, the data may be manipulated and parsed by the various Supply Chain Entities subject to various security measures as discussed below. A plurality of standard procedures exists to aid in the manipulation of the data. Examples of suitable procedures comprise methods for calculating typical statistical values such as mean, median, average, standard deviation, maximum value, minimum value, variance, and the like. These procedures are listed as illustrations only and do not limit the scope of the present invention in any way. Alternatively, the Supply Chain Entities may develop and generate a custom procedure to extract and manipulate the data for their specific purpose. Examples of custom procedures are discussed below.

The systems and methods may include a number of security measures to protect the intellectual property and confidential information for the various Supply Chain Entities of the renewable energy system supply chain. The security measures comprise software passwords, tokens, smart cards, biometric identification means, and the like. The security measures ensure that any specific System Integrator, VAR, or OEM manufacturer is only allowed access to the detailed data generated by systems under their specific responsibility. However, the System Integrators, VARs, or OEM manufacturers may request results based on the analysis of the aggregated data across the database so that they may compare their data to the larger population of systems.

Figure 5:
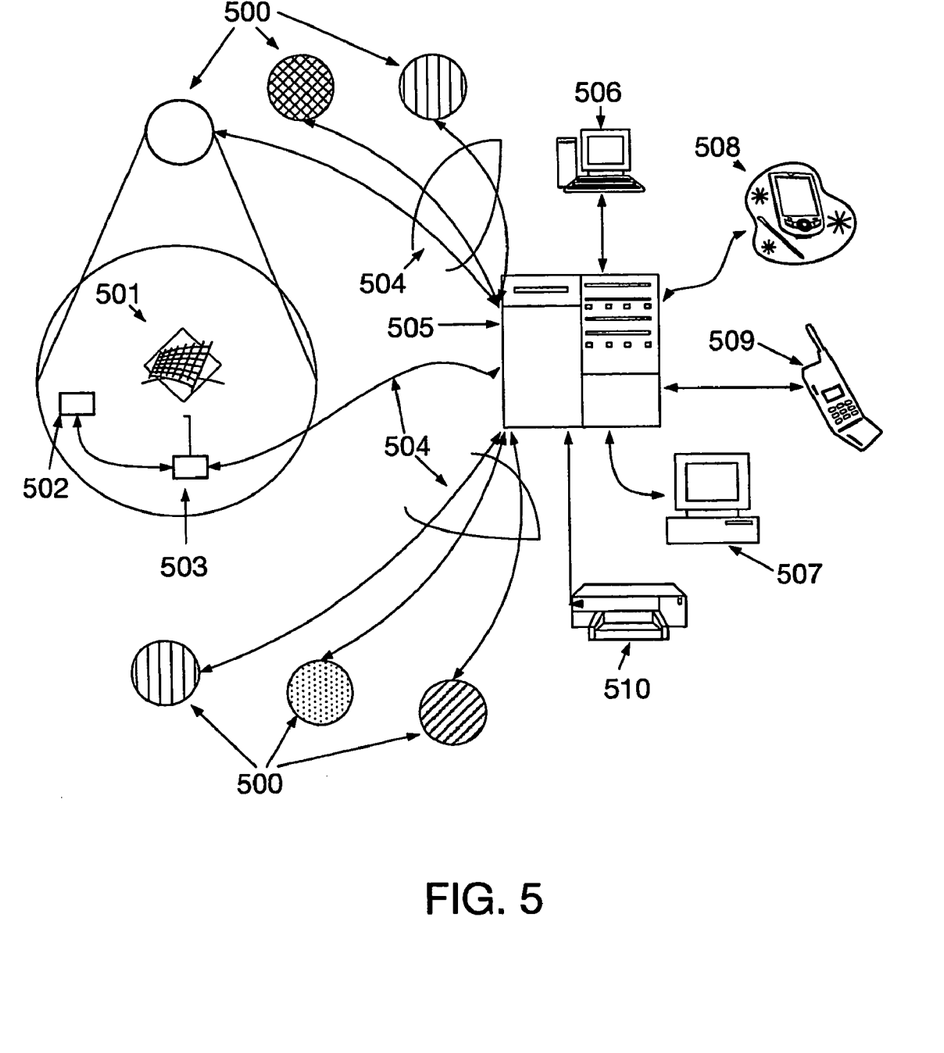
FIG. 5 is a schematic representation of a system pertaining to some embodiments of the present invention.

The database may contain data from systems installed worldwide by a large number of Supply Chain Entities. The different pattern fill of the circles representing systems, 500, illustrated in FIG. 5 is meant to convey that these systems are associated with different Supply Chain Entities. Comparisons and analyses may be completed by aggregating data from systems with similar features comprising System Integrator ID, VAR ID, Installation Technician ID, expected system power output, system configuration with OEM component identification, system wiring details, system tracking features, system tracking capabilities, installation region, system orientation, system tilt angle, expected shading, firmware revision, system parameter settings, system response, system performance, ambient temperature, solar irradiance, conversion efficiency, current tilt angle, system energy output, device fault and error codes, power, voltage, cumulative energy generated, and the like. Advantageously, the database enables the Supply Chain Entities to compare detailed data across systems under their responsibility or to compare their data to benchmark or aggregated data across the entire database. For example, a System Integrator may compare detailed data for his systems installed across a large region such as North America. Alternatively, the same System Integrator may compare data for one or more of his systems with benchmark or aggregated data for systems installed in a completely different region such as Europe.

In some embodiments of the present invention, the systems and methods may be applied to solar energy generation systems as an example. In an exemplary embodiment, the system may be installed following an established installation checklist. The system may contain a number of components that have variable settings to enhance the performance of the components and system based on a number of factors such as system configuration, OEM component identification, system wiring details, installation region, typical weather patterns, system orientation, system tilt angle, system tracking features, system tracking capabilities, expected shading and the like. The components may be remotely addressable meaning that they may accept commands and download settings from a remote site. This may allow the services to provide a number of advantageous features comprising remote maintenance, resetting various devices (e.g., warm or cold system booting), changing operating parameters, upgrading firmware, control of ventilation fans, and the like.

Figure 2:
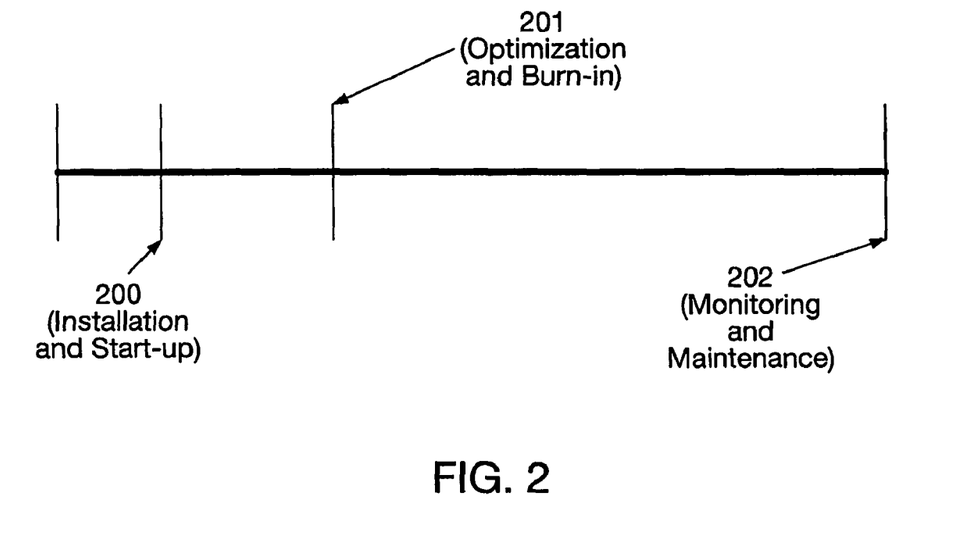
FIG. 2 represents a schematic representation of a timeline illustrating the various phases of "Installation and Configuration", "Optimization and Burn-in", and "Monitoring and Maintenance" comprised in various embodiments of the present invention.

Referring now to the Installation and Configuration phase, 200, of FIG. 2, the Installation Technician may complete the hardware installation and basic functionality testing according to the established installation checklist. This phase typically lasts about 5 days. At the proper step in the procedure, the Installation Technician may connect the system to the central database via a suitable network. Examples of suitable networks comprise the Internet, a Local Area Network (LAN), a Wide Area Network (WAN), a wireless network, cellular networks (e.g., GSM, GPRS, etc.), combinations thereof, and the like. The Installation Technician may transmit system specific data to the central database comprising, system identification data, system configuration data, system installation data, and the like. The Installation Technician may then transmit a request to the central database for automatic configuration, calibration, and start-up of the system. Typically, the services may select the current BKM configuration established from aggregated data from a plurality of systems with similar attributes. The BKM configuration comprising, OEM component parameter settings, system software and firmware settings, system parameters, and the like may be downloaded directly into the system control devices or communicated to the Installation Technician for manual programming if the system hardware cannot accept remote downloads. The system installation may be completed and the system may begin to generate energy. The services may monitor the system for a time interval as illustrated in the Optimization and Burn-in phase, 201, of FIG. 2 to ensure that the system performance metrics meet the benchmark performance metrics. This phase is typically about 30 days. The on-going system performance data may be collected and transmitted to the central database via the network during the Monitoring and Maintenance phase, 202, as illustrated in FIG. 2. This phase typically lasts for the remaining life of the system, but at least as long as the system warranty. The data may be aggregated with data from similar systems within the central database.

Figure 3:
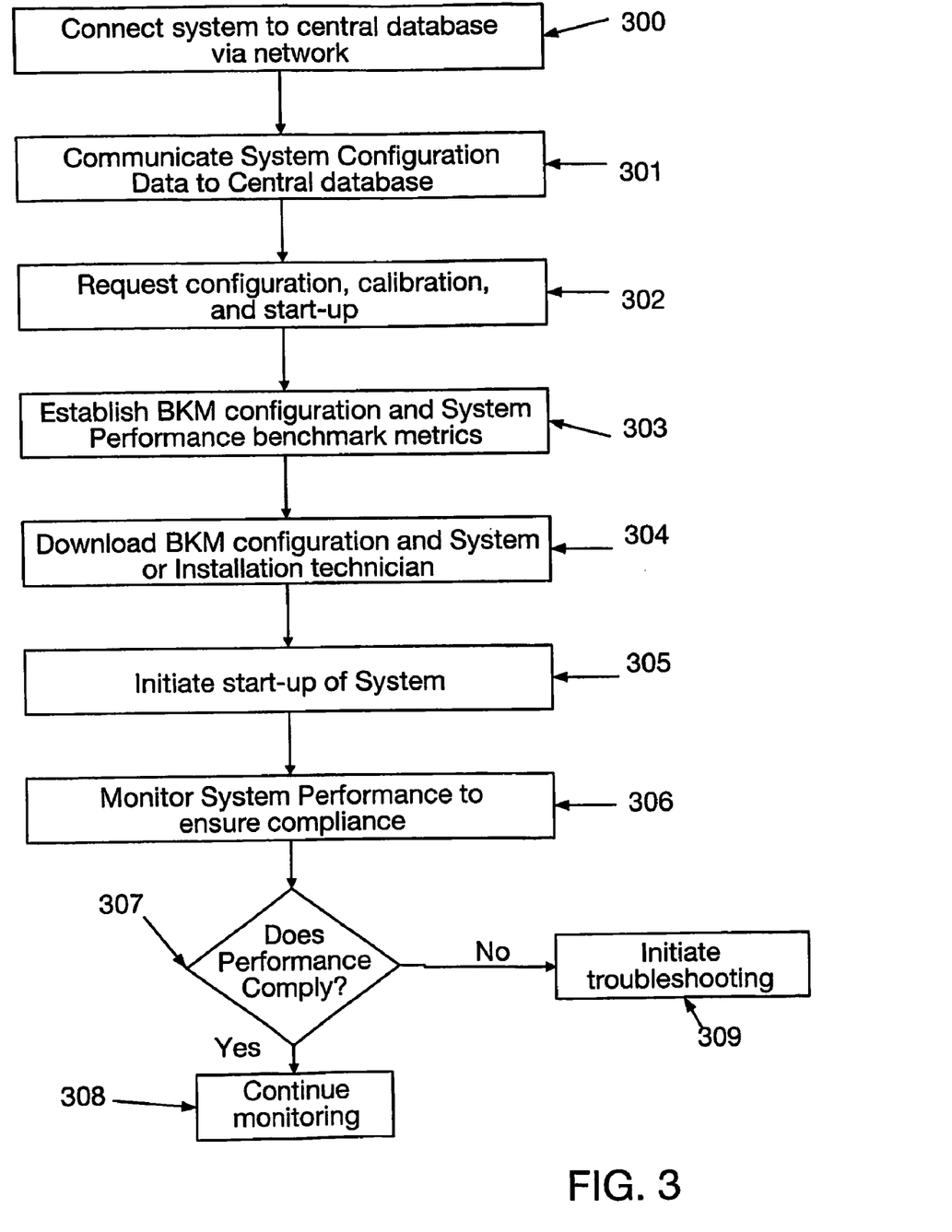
FIG. 3 is a flow chart of steps in some embodiments of the present invention.

In some embodiments of the present invention, the methods and procedures for configuration calibration and start-up of the system followed by monitoring of the system during the Optimization and Burn-in phase may follow the steps, 300-309, as outlined in FIG. 3. These exemplary steps are not meant to limit the scope of the present invention.

The aggregated data may be used to establish a number of installed system performance benchmark metrics, said benchmark metrics comprising system performance, energy generation, current, voltage, device error codes, system efficiency, system response time, "typical meteorological year" (TMY) data, and the like. Values may be established that form the benchmark metric. The services may use the collected, aggregated, analyzed data and the benchmark metrics to establish a BKM system configuration.

Typically, the services may compare individual system performance metrics to the benchmark metrics and highlight systems whose performance exceeds the benchmark metrics. The services may compare the details of the system such as system configuration, OEM components, system size, installation region, typical weather patterns, system orientation, system tilt angle, system tracking features, system tracking capabilities, expected shading, and the like to the BKM configuration. If the difference is significant as determined by the System Integrators, VARs, or OEM manufacturers and is correlated with other systems with similar configurations, the data may be used to improve the benchmark metrics and the system configuration may be used to update the BKM configuration. This activity occurs during the Optimization and Burn-in phase, 201, as illustrated in FIG. 2.

Referring now FIG. 2, the Monitoring and Maintenance phase, 202, the services may monitor the system performance and may highlight systems whose performance falls below the benchmark metrics. This data may highlight systems that may need attention. Typically, this functionality has only been implemented locally at the site of the system installation via manual meter reads or utility bill comparison and is rarely maintained in practice. The ability to provide this automated functionality, data collection, data aggregation, data analysis, and response from a central location is advantageously provided by some embodiments of the present invention. The services may provide initial levels of troubleshooting and corrective action responses to the poor system performance. The responses may comprise identifying differences between the system configuration and the BKM configuration and the like. The differences may be in parameters comprising, internal system settings, firmware version number, preferred OEM components, upgraded hardware, and the like.

Typically, the services may recommend actions that may comprise, hardware upgrades, firmware upgrades, requirement for on-site service calls, and the like. The services may determine if the system might be covered by warranties or service contracts. The services may notify the System Integrators, VARS, and OEM component suppliers of the results of the initial troubleshooting activities and the recommended corrective action.

The services may be enabled to perform upgrades of internal system settings and firmware for systems covered by warranties or service contracts. Upon completion of the responses, the services may acknowledge an electronic receipt of the change in system configuration and update the database in the System History Data file. Failure and lifetime data may be included in the services used to generate and maintain the BKM configuration.

Additionally, the services may be enabled to perform periodic upgrades of internal system settings and firmware based on changes in the seasons. It is well known that System Performance metrics comprising the efficiency, response, current, voltage, energy generation, and the like of solar energy systems are sensitive to factors comprising temperature, solar irradiance, orientation, tilt angle, shading, firmware revision, system parameter settings, and the like. It may be expected that the BKM configuration may be different depending on the specific season. The services may make periodic changes to these settings to improve the System Performance metrics. Upon completion of the responses, the services may acknowledge an electronic receipt of the change in system configuration and update the database in the System History Data file. Failure and lifetime data may be included in the services used to generate and maintain the BKM configuration.

Figure 4:
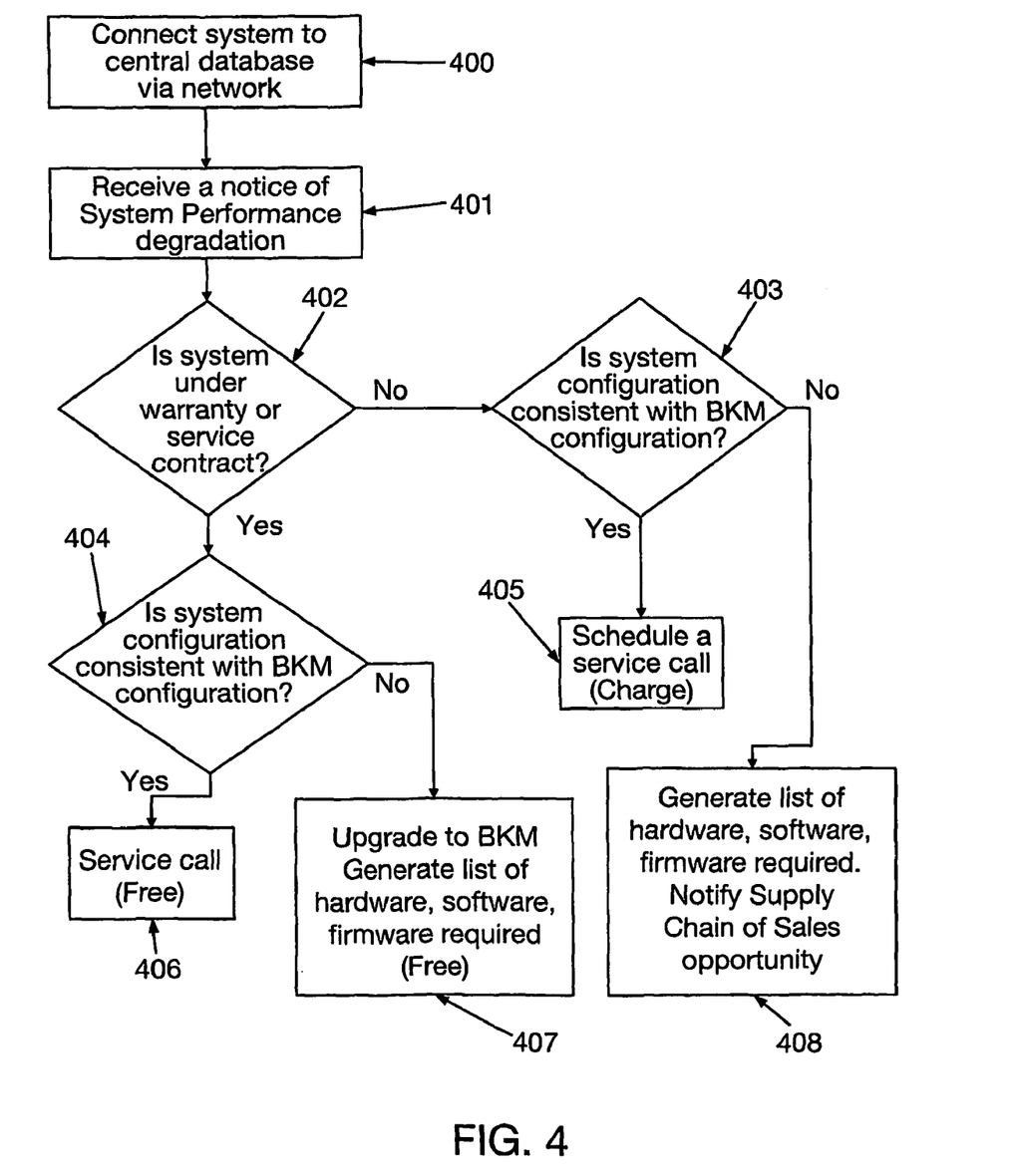
FIG. 4 is a flow chart of steps in some embodiments of the present invention.

In some embodiments of the present invention, the methods and procedures for monitoring system performance, receiving notification that a system is exhibiting degraded performance, determining if the system is covered by a warranty guarantee or a service contract, performing a remote troubleshooting operation on the system, ensuring that the system configuration is consistent with the BKM configuration, upgrading the system configuration if does not conform to the BKM configuration, generating a list of hardware, software, and firmware that may be required, and notifying the Supply Chain Entities of a possible sales opportunity may follow the steps, 400-408, as outlined in FIG. 4. These exemplary steps are not meant to limit the scope of the present invention.

Table 1 illustrates a subset of the data that might be contained in the central database. The first three rows illustrate the benchmarks for exemplary solar energy systems of various sizes, in this case, 20 kilowatts (kW), 50 kW, and 100 kW. These benchmarks may be established from the entire population of solar energy installations included in the database or may be established from systems only under the direct control of the System Integrators, VARs, or OEM suppliers. This type of data aggregation and analysis is not currently possible since the various Supply Chain Entities in the solar energy supply chain do not typically collect data or share any detailed data with each other. Table 1 contains data from various systems installed in the same region having similar compass and tilt angle settings. Sample installation performance data is included that captures the maximum power output and conversion efficiency for each system to be used as metrics to establish performance metrics for the system.

Table 2 illustrates exemplary results of one possible analysis of the data contained in Table 1. For illustrative purposes, if the performance metric exceeded the benchmark, it was given a value of "+1", if the performance metric was equal to the benchmark, it was given a value of "0", and if the performance metric fell below the benchmark, it was given a value of "−1". It is clear from the data in Tables 1 and 2 that systems "3, 4, and 5" perform well and may be deserving of additional consideration and investigation because the results are positive in each of the categories meaning that their performance metrics exceeded the benchmark metrics. Likewise, systems "1, 2, 7, and 9" show poor performance in both areas and may need service calls or troubleshooting activities due to the negative results in these areas. This procedure for treatment of the data is for illustration purposes only. It will be clear to those skilled in the art that there are many procedures comprising many analytical methods that may be used to analyze the original data. The use of this illustration in no way limits the scope of the present invention.

TABLE 1

Illustrative installation data for a solar energy system

| System | Size | Region | Compass Angle | Tilt Angle | Available Solar Energy | Maximum Power Output | Conversion Efficiency |
|---|---|---|---|---|---|---|---|
| Benchmark 20 kW | 20 kW | CA | South | 45° | 100 kW/m² yr | 18 kW | 20.0% |
| Benchmark 50 kW | 50 kW | CA | South | 45° | 100 kW/m² yr | 45 kW | 20.0% |
| Benchmark 100 kW | 100 kW | CA | South | 45° | 100 kW/m² yr | 90 kW | 20.0% |
| 1 | 20 kW | CA | South | 45° | 100 kW/m² yr | 16 kW | 17.8% |
| 2 | 20 kW | CA | South | 40° | 100 kW/m² yr | 10 kW | 11.1% |
| 3 | 50 kW | CA | South | 45° | 100 kW/m² yr | 55 kW | 24.4% |
| 4 | 100 kW | CA | South | 35° | 100 kW/m² yr | 92 kW | 20.4% |
| 5 | 50 kW | CA | South | 40° | 100 kW/m² yr | 46 kW | 20.4% |
| 6 | 20 kW | CA | South | 45° | 100 kW/m² yr | 18 kW | 20.0% |
| 7 | 100 kW | CA | South | 35° | 100 kW/m² yr | 85 kW | 18.9% |
| 8 | 100 kW | CA | South | 40° | 100 kW/m² yr | 90 kW | 20.0% |
| 9 | 50 kW | CA | South | 45° | 100 kW/m² yr | 40 kW | 17.8% |

TABLE 2

Illustrative installation data analysis for a solar energy system

| System | Maximum Power Output | Conversion Efficiency |
|---|---|---|
| 1 | −1 | −1 |
| 2 | −1 | −1 |
| 3 | +1 | +1 |
| 4 | +1 | +1 |
| 5 | +1 | +1 |
| 6 | 0 | 0 |
| 7 | −1 | −1 |
| 8 | 0 | 0 |
| 9 | −1 | −1 |

Referring now to FIG. 5, the methods of some embodiments of the present invention may be implemented on a plurality of systems. The systems may comprise one or more energy systems, 500, sensors contained within the energy system to monitor various settings and performance attributes of the energy system, sensors associated with the energy system to measure various environmental conditions, 502, a local communications device for managing two-way communications between the sensors, the energy systems, and a network, 503, a network for transmitting the data to a centralized database, 504, a centralized database for receiving and storing data from the plurality of systems, 505, user interfaces for interacting with the centralized database, 506-509, procedures for acting upon the data, and a plurality of output devices for displaying the results of the procedure action, 506-510.

Continuing to refer to FIG. 5, in some exemplary embodiments comprising solar energy generation systems, the sensors contained within the system may monitor various settings and performance attributes comprising, system response, system performance, conversion efficiency, current tilt angle, system energy output, current firmware revision, current system parameter settings, device fault and error codes, power, voltage, cumulative energy generated, and the like. Sensors associated with the system, 502, may measure various environmental conditions comprising ambient temperature, solar irradiance, and the like. The data may be communicated onto a network, 504, by a local communications device, 503. Examples of suitable networks comprise the Internet, a Local Area Network (LAN), a Wide Area Network (WAN), a wireless network, cellular networks (e.g., GSM, GPRS, etc.), combinations thereof, and the like. The data may be received and stored on a centralized database, 505. The data in the centralized database may be accessed by a plurality of user interfaces comprising computer terminals, 507, personal computers (PCs), 506, personal digital assistants (PDAs), 508, cellular phones, 509, interactive displays, and the like. This allows the user to be located remotely from the centralized database. As mentioned previously, the centralized database contains a variety of security features to prevent sensitive detailed data from being viewed or accessed by users without the proper security clearance. Procedures may be used to act on the data to generate results of various inquires. The procedures may be part of a standard set of calculations or may be developed and generated by the user. The results of the action by the procedures may be displayed to the user on a number of output means. Examples of suitable output means comprise computer terminals, 507, personal computers (PCs), 506, printers, 510, LED displays, personal digital assistants (PDAs), 508, cellular phones, 509, interactive displays, and the like.

Figure 6:
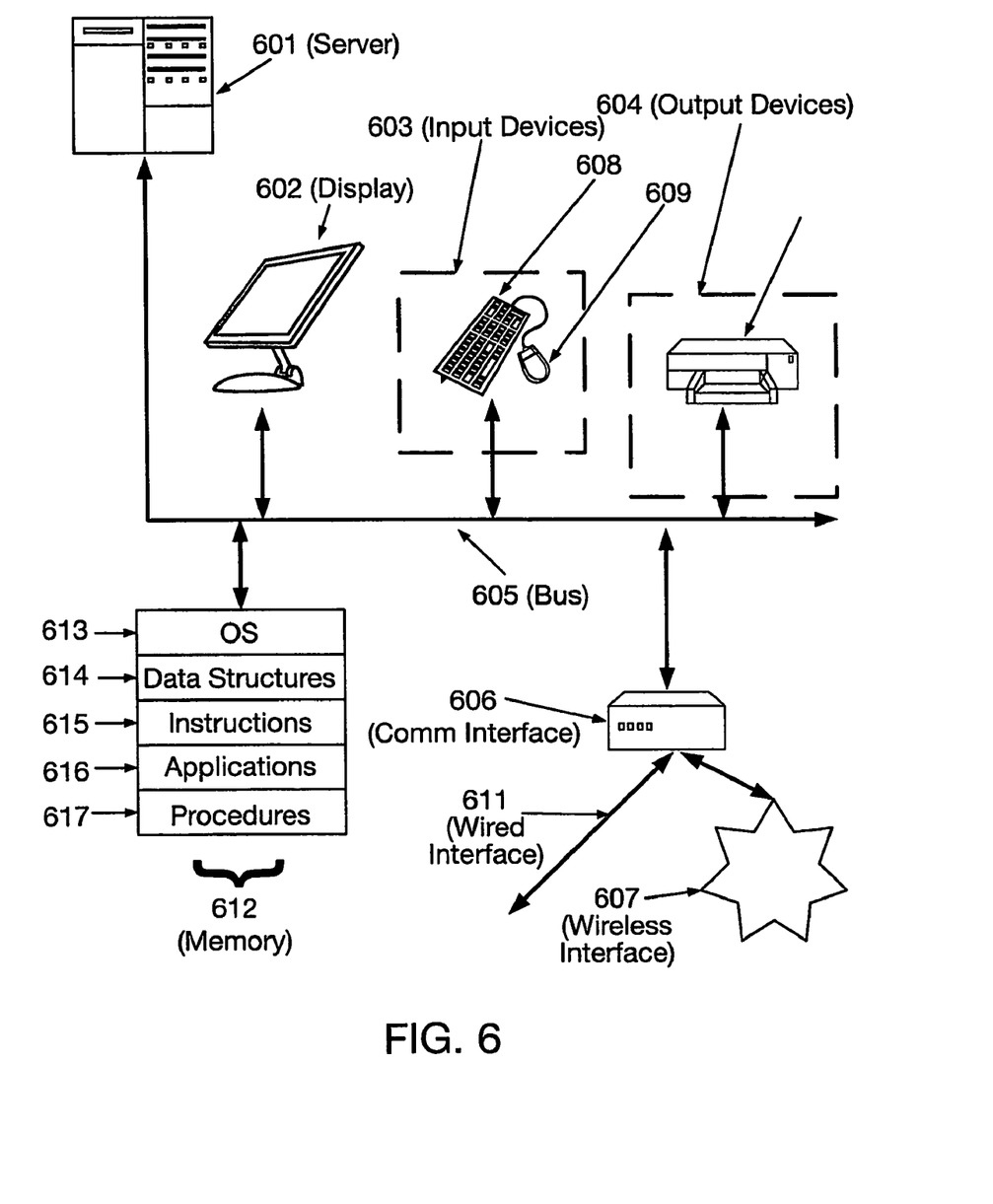
FIG. 6 depicts an illustrative computer system pertaining to various embodiments of the present invention.

FIG. 6 depicts an illustrative computer system pertaining to various embodiments of the present invention. In some embodiments, the computer system comprises a server 601, display, 602, one or more input interfaces, 603, communications interface, 606, and one or more output interfaces, 604, all conventionally coupled by one or more buses, 605. The server, 601, comprises one or more processors (not shown) and one or more memory modules, 612. The input interfaces, 603, may comprise a keyboard, 608, and a mouse, 609. The output interface, 604, may comprise a printer, 610. The communications interface, 606, is a network interface that allows the computer system to communicate via a wireless or hardwired network, 607, as previously described. The communications interface, 607, may be coupled to a transmission medium, 611, such as a network transmission line, for example, twisted pair, coaxial cable, fiber optic cable, and the like. In another embodiment, the communications interface, 611, provides a wireless interface, that is, the communication interface, 611 uses a wireless transmission medium. Examples of other devices that may be used to access the computer system via communications interface, 606, comprise cell phones, PDAs, personal computers, and the like (not shown).

The memory modules, 612, generally comprises different modalities, illustratively semiconductor memory, such as random access memory (RAM), and disk drives as well as others. In various embodiments, the memory modules, 612, store an operating system, 613, collected and aggregated data, 614, instructions, 615, applications, 616, and procedures, 617.

In various embodiments, the specific software instructions, data structures and data that implement various embodiments of the present invention are typically incorporated in the server, 601. Generally, an embodiment of the present invention is tangibly embodied in a computer readable medium, for example, the memory and is comprised of instructions, applications, and procedures which, when executed by the processor, causes the computer system to utilize the present invention, for example, the collection, aggregation, and analysis of data, establishing BKM configurations, comparing configuration data to the BKM configuration, transmitting the BKM configuration data to the system or Installation Technician, displaying the results of the analyses, and the like. The memory may store the software instructions, data structures, and data for any of the operating system, the data collection application, the data aggregation application, the data analysis procedures, and the like in semiconductor memory, in disk memory, or a combination thereof.

The operating system may be implemented by any conventional operating system comprising Windows® (Registered trademark of Microsoft Corporation), Unix® (Registered trademark of the Open Group in the United States and other countries), Mac OS® (Registered trademark of Apple Computer, Inc.), Linux® (Registered trademark of Linus Torvalds), as well as others not explicitly listed herein.

In various embodiments, the present invention may be implemented as a method, system, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier or media. In addition, the software in which various embodiments are implemented may be accessible through the transmission medium, for example, from a server over the network. The article of manufacture in which the code is implemented also encompasses transmission media, such as the network transmission line and wireless transmission media. Thus the article of manufacture also comprises the medium in which the code is embedded. Those skilled in the art will recognize that many modifications may be made to this configuration without departing from the scope of the present invention.

The exemplary computer system illustrated in FIG. 6 is not intended to limit the present invention. Other alternative hardware environments may be used without departing from the scope of the present invention.

The foregoing descriptions of exemplary embodiments of the present invention have been presented for the purpose of illustration and description. They are not intended to be exhaustive or to limit the present invention to the precise forms disclosed, and obviously many modifications, embodiments, and variations are possible in light of the above teaching.

What is claimed is:

1. A computer implemented method for system start-up, calibration, and configuration, comprising:
    connecting an installed System to a central database via a network;
    communicating System Configuration Data to said central database via said network;
    sending a request to said central database requesting configuration, calibration, and start-up of the system;
    establishing Best Known Method configuration data and System Performance benchmark metrics from said central database established from aggregated data from systems with similar System Configuration Data;
    downloading said Best Known Method configuration data to the system and initiating the start-up of said installed system;
    monitoring said installed system for an Optimization and Burn-in time interval; and
    highlighting performance metrics of said installed system which fail to meet said System Performance benchmark metrics.

2. The method of claim 1 wherein said System comprises an energy system.

3. The method of claim 2 wherein said energy system comprises an energy usage system an energy storage system, an energy management system, or an energy generation system.

4. The method of claim 3 wherein said energy generation system comprises a renewable energy generation system.

5. The method of claim 4 wherein said renewable energy generation system comprises a solar energy generation system, a wind turbine energy generation system, a tidal energy generation system, a geothermal energy generation system, or a waste to energy system.

6. A computer implemented method troubleshooting system performance metrics, comprising:
    connecting an installed System to a central database via a network;
    receiving a notice of decreased system performance with respect to established System Performance benchmark metrics and the results of a troubleshooting or corrective action activity;
    determining if said installed System is covered by a warranty guarantee;
    determining if said installed System is covered by a service contract;
    determining if said installed System configuration is consistent with an established Best Known Method configuration comprising hardware, software, and firmware upgrades;
    upgrading said installed System to said Best Known Method configuration if said installed System configuration is not consistent with said Best Known Method configuration;
    generating a list comprising hardware software, and firmware that may return said installed System performance metrics to established System Performance benchmark metrics; and
    notifying members of the supply chain of a possible Sales opportunity.

7. The method of claim 6 wherein said System comprises an energy system.

8. The method of claim 7 wherein said energy system comprises an energy usage system an energy storage system, an energy management system, or an energy generation system.

9. The method of claim 8 wherein said energy generation system comprises a renewable energy generation system.

10. The method of claim 5 wherein said renewable energy generation system comprises a solar energy generation system, a wind turbine energy generation system, a tidal energy generation system, a geothermal energy generation system, or a waste to energy system.

11. A system for start-up, calibration, and configuration of Energy Systems, comprising:
    one or more Energy Systems requiring start-up, calibration, and configuration;
    sensors coupled to said Energy Systems and functional to monitor settings and performance attributes data associated with said Energy Systems;
    sensors coupled to said Energy Systems and functional to measure environmental conditions data;
    a local communications device coupled to said Energy Systems and functional to communicate said Energy Systems settings and performance attributes data and said environmental conditions data onto a network capable of transmitting said Energy Systems settings and performance attributes data and said environmental conditions data;
    a centralized database coupled to the network and functional to receive and store said Energy Systems settings and performance attributes data and said environmental conditions data;
    a user interface functional to permit remote interaction with said centralized database;
    a computer readable medium containing procedures functional to act upon said Energy Systems settings and performance attributes data and said environmental conditions data, the procedures comprising one or more of
        establishing Best Known Methods (BKM) configuration data based on data from said Energy Systems and one or more systems otherwise not associated with said Energy Systems,
        establishing an Energy System configuration from said Energy System settings and performance attributes data, and
    transmitting said Best Known Methods (BKM) configuration data back across said network to said one or more Energy Systems via one or more transmitting output devices coupled to the computer readable medium; and
    display output devices for displaying the results of said procedure action upon said Energy Systems settings and performance attributes data and said environmental conditions data.

12. The system of claim 11 wherein said one or more Energy Systems comprise at least one Energy System selected from the group comprising an energy usage system, an energy storage system, an energy management system, or an energy generation system.

13. The system of claim 12 wherein said energy generation system comprises a renewable energy generation system.

14. The system of claim 13 wherein said renewable energy generation system comprises a solar energy generation system, a wind turbine energy generation system, a tidal energy generation system, a geothermal energy generation system, or a waste to energy system.

15. A system for responding to a decrease in the level of system performance metrics, comprising:
one or more Energy Systems;
sensors coupled to said Energy Systems and effective to monitor said Energy Systems settings and performance attributes data;
sensors coupled to said Energy Systems and effective to measure environmental conditions data;
a local communications device coupled to said Energy Systems and effective to communicate said Energy Systems settings and performance attributes data and said environmental conditions data onto a network capable of transmitting said Energy Systems settings and performance attributes data and said environmental conditions data;
a centralized database coupled to the network and effective to receive and store said Energy Systems settings and performance attributes data and said environmental conditions data;
a user interface functional to permit remote interaction with said centralized database;
a computer readable medium containing procedures functional to act upon said Energy Systems settings and performance attributes data and said environmental conditions data, the procedures comprising one or more of
establishing benchmark metrics for Energy System performance,
establishing Energy System performance metrics,
determining conformance of said Energy System performance metrics to said benchmark metrics,
transmitting said Best Known Methods (BKM) configuration data back across said network to said one or more Energy Systems via one or more transmitting output devices, and
generating lists of suggested actions to conform said Energy System performance metrics to said benchmark metrics; and
display output devices functional to display the results of said procedure action upon said Energy Systems settings and performance attributes data and said environmental conditions data.

16. The system of claim 15 wherein said one or more Energy Systems comprise at least one Energy System selected from the group comprising an energy usage system, an energy storage system, an energy management system, or an energy generation system.

17. The system of claim 16 wherein said energy generation system comprises a renewable energy generation system.

18. The system of claim 17 wherein said renewable energy generation system comprises a solar energy generation system, a wind turbine energy generation system, a tidal energy generation system, a geothermal energy generation system, or a waste to energy system.

* * * * *